April 18, 1961 H. P. DOETSCH 2,980,418
SELF-ADJUSTING HYDRAULIC SHOCK ABSORBER
Filed Oct. 6, 1958
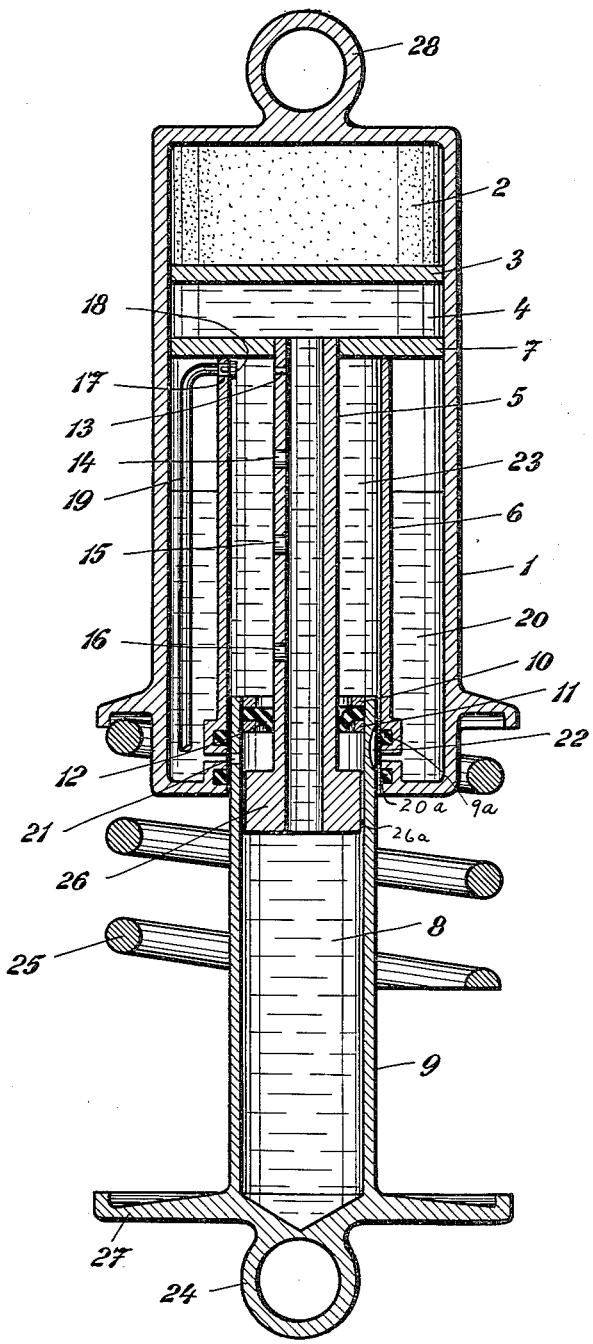
INVENTOR:
HANS-PETER DOETSCH
BY
Richardson, David and Nordon
ATTORNEYS.

United States Patent Office 2,980,418
Patented Apr. 18, 1961

2,980,418
SELF-ADJUSTING HYDRAULIC SHOCK ABSORBER

Hans Peter Doetsch, Bayreuth, Germany

Filed Oct. 6, 1958, Ser. No. 765,445

Claims priority, application Germany Oct. 10, 1957

7 Claims. (Cl. 267—34)

The present invention relates to a self-adjusting shock absorber suitable for use with wheeled vehicles and which automatically adjusts itself to operate effectively for loads of different weights which are carried by the vehicle from time to time.

Generally the shock absorber of the present invention comprises a main cylinder and a movable cylinder which moves inwardly and outwardly of the main cylinder in response to road shocks. A reservoir for hydraulic fluid is provided. When the load is increased, fluid is pumped from the reservoir into the shock absorber system thereby increasing the mean stress applied to the resilient portion of the shock absorber. When operating at light loads, the pumped fluid is returned to the reservoir when the movable cylinder reaches the terminal portion of its outward movement. Under heavy loads, however, the fluid pumped from the reservoir is retained in order to maintain the increased stressing of the resilient portion. Under heavy loads, the limit of outward movement of the movable cylinder is reduced so that the pumped fluid is not returned to the reservoir. As soon as light loading is resumed, the travel of the movable cylinder is increased and the pumped fluid is returned through passages which remain closed for heavy loads.

Various objects, features and advantages of the invention will become apparent upon reading the following specification together with the accompanying drawing forming a part hereof.

Referring to the drawing, the single figure is a side view in axial section of a shock absorber embodying the invention.

The shock absorber comprises a main outermost cylinder 1. In the top of the main or outermost cylinder 1, there is disposed a suitable resilient medium such as a compressed gas 2. The gas 2 is confined within the closed top of the outermost cylinder 1 by a freely vertically movable wall or partition 3. Below the partition 3, there is a high pressure working space 4. The upper end of an innermost or damping control cylinder 5 communicates with the working space 4. The control cylinder 5 is disposed within an intermediate stationary cylinder 6 which is fixed at its upper end to the fixed partition 7. The partition 7 constitutes the bottom wall of the working space 4. The lower end of the control cylinder 5 communicates with the interior 8 of a vertically movable cylinder 9. The movable cylinder 9 slides freely within the intermediate cylinder 6 and a packing or sealing ring 9a disposed at the lower end of the intermediate cylinder 6 engages the outer surface of the movable cylinder 9 and prevents liquid leakage therepast during reciprocation of the movable cylinder 9.

Clamped between annular nuts 10 and 11 at the top of the movable cylinder 9 is a flexible check valve and sealing member 12. The check valve member 12 has a sealing lip which engages the control cylinder 5 and permits liquid within the intermediate cylinder 6 to flow freely unidirectionally into the interior 8 of movable cylinder 9, while preventing flow in the reverse direction.

Axially spaced orifices 13, 14, 15 and 16 are formed in the wall of the control cylinder 5. An aperture 17 is formed in the wall of the intermediate cylinder 6 near its upper end. A check valve 18 is disposed at the upper end of a downwardly extending refill pipe 19 which extends through the aperture 17 and communicates at its lower end with a reservoir space 20 between the outermost cylinder 1 and the intermediate cylinder 6. A packing or sealing ring 20a prevents leakage of liquid in the reservoir space 20 around the external surface of the movable cylinder 9. An orifice 21 is formed in the wall of the movable cylinder 9 near its upper or inner end and in the extended position shown in the drawing, the orifice 21 places the reservoir space 20 in communication with the upper portion of the interior 8 of the movable cylinder 9. A longitudinal groove 22 is formed in the external surface of the movable cylinder 9 near its upper end. Slightly before the movable cylinder 9 reaches the extended position shown in the drawing, the groove 22 by-passes the sealing ring 9a, temporarily placing the interior 23 of the intermediate cylinder 6 in communication with the reservoir space 20 during the terminal portion of the outward movement of the cylinder 9. A ring 24 for connection to the axle of a vehicle is provided at the lower end of the movable piston 9. A helical compression spring 25 is fixedly secured at its upper end to the outermost cylinder 1. A piston 26 provided with by-pass passages 26a is disposed at the lower end of the control cylinder 5. The piston 26 guides the movable cylinder 9 during its vertical reciprocation and restricts liquid flow between the upper and lower portions of its interior 8. A flange 27 at the lower end of movable cylinder 9 is engageable with the lower end of compression spring 25 under maximum load conditions. A ring 28 is provided at the top of the main cylinder 1 for connection to the body of the vehicle. A suitable hydraulic fluid completely fills the working space 4, the interior 8 of the movable piston 9 and the space 23 within the intermediate cylinder 6. The reservoir space 20 is only partially filled with the hydraulic fluid.

In operation, when the vehicle passes over a bump, the movable cylinder 9 is forced upwardly within the intermediate cylinder 6. Liquid is forced up through the control cylinder 5 into the working space 4, thereby moving the partition 3 upwardly and increasing the pressure of the compressed gas 2. Liquid also enters the control cylinder 5 through the metering orifices 14, 15 and 16. If the cylinder 9 moves to the limit of its upward or inward travel, so that the annular nut 10 abuts the wall 7, the return movement is produced by the action of the compressed gas 2 and the speed of return movement is controlled in part by the flow-restricting action of the piston 26 with its by-pass passages 26a. During the initial portion of the return stroke, liquid below the check valve 12 may enter the interior of control cylinder 5 through the metering orifices 14, 15 and 16. However, as the return movement proceeds, the metering orifices are successively shut off from communication with the upper portion of the space 8 above the fixed piston 26 and during the final portion of the return stroke, all liquid flow must take place through the by-pass passages 26a of the piston 26. The damping or retarding action is thus progressively increased as the downward return movement of cylinder 9 proceeds. During this return movement, the action of check valve 12 creates a suction which causes liquid to be drawn upwardly through the refill pipe 19 and check valve 18 from the reservoir space 20 so that the interior of the intermediate cylinder 6 is maintained filled.

The drawing of liquid into the space 23 within intermediate cylinder 6 increases the total volume of liquid which is present in the system 4—5—8—23 and thus increases the pressure which is applied to the compressed gas 2 during upward movement of the cylinder 9. For a light or normal load, the pressure applied to the liquid in the system 4—5—8—23 by the compressed gas 2 will cause liquid to be returned to the reservoir space 20 when the groove 22 by-passes the sealing ring 9a and also slightly later when the cylinder 9 reaches the lower limit of its travel and the orifice 21 is placed in communication with the reservoir space 20 in the fully extended condition of the shock absorber as shown in the drawing.

If the vehicle is more heavily loaded, however, the piston 9 will not move downwardly to its full limit of travel and the additional liquid drawn in from reservoir 20 will be retained within the system 4—5—8—23. This increases the average working pressure applied to the compressed gas 2 so that compensation is made automatically for the increased load.

The orifice 17 at the top of the control cylinder 5 is of very small cross-section. During very slow downward movement of the cylinder 9, leakage through the small orifice 17 prevents liquid from being drawn from reservoir 20 through refill pipe 19 and check valve 18. The uppermost large orifice 13 in the control cylinder 5 stops the drawing of liquid from the reservoir 20 as soon as it has been passed by the check valve 12 during downward movement of the cylinder 9. As soon as this occurs, liquid can flow freely through orifice 14 from working space 4 and the interior of control cylinder 5 into the space 23 within the intermediate cylinder 6. As stated above, resistance to downward movement of cylinder 9 is increased as orifices 15 and 16 are successively shut off from communication with the upper portion of cylinder 9 and the check valve 12 is constrained to force increased proportions of the liquid in the upper portion of cylinder 9 through the passages 26a past the stationary piston 26.

When the vehicle load is increased, a few reciprocatory movements of the cylinder 9 will suffice to pump enough fluid into the system 4—5—8—23 to apply a suitably increased pressure to the compressed gas 2. When the vehicle is heavily loaded or overloaded, the resilient action of the compressed gas 2 is augmented by engagement of the flange 27 with the lower end of the compression spring 25 during the terminal portion of the upward movement of the cylinder 9. To assist in the pumping action for load equalization, gas under pressure may advantageously be disposed in the space above the fluid in the partially filled reservoir space 20.

It will be apparent to those skilled in the art that various modifications may be made in the embodiment of the invention which has been herein shown and described without departing from the spirit and scope of the invention as defined in the appended claims.

What is claimed is:

1. A shock absorber comprising in combination; a main cylinder closed at one end, said closed end being adapted to be connected to the body of a wheeled vehicle; a movable cylinder coaxial with said main cylinder and movable inwardly and outwardly of said main cylinder, said movable cylinder being closed at its outer end and open at its inner end, said outer end being adapted to be connected to an axle of said vehicle; a first sealing means providing a liquid-tight connection between said cylinders during reciprocatory axial movement of said movable cylinder; an axially movable partition spaced from said closed end of said main cylinder; resilient means yieldingly urging said partition away from said closed end of said main cylinder; a fixed partition connected to said main cylinder and spaced from said movable partition and defining therewith a working space between said partitions; a control cylinder having one end connected to said fixed partition, said control cylinder being coaxial with said main cylinder, the interior of said control cylinder communicating with said working space and with the interior of said movable cylinder; a fixed piston disposed at the other end of said control cylinder, said piston guiding said movable cylinder; a second sealing means including check valve means disposed at the inner end of said movable cylinder and engaging the external surface of said control cylinder; an intermediate cylinder disposed between said main and control cylinders, said intermediate cylinder being coaxial with said main cylinder, one end of said intermediate cylinder being fixed to said fixed partition, said intermediate and main cylinders defining a reservoir space therebetween; refill pipe means having one end in communication with said reservoir space and the other end in communication with the interior of said intermediate cylinder adjacent to said fixed partition; hydraulic fluid partially filling said reservoir space and completely filling the interiors of said intermediate cylinder, said control cylinder, said movable cylinder and said working space; further check valve means connected to said refill pipe means, said further check valve means permitting fluid to flow unidirectionally from said reservoir space into the interior of said intermediate cylinder; a third sealing means disposed at the other end of said intermediate cylinder and cooperating with the external surface of said movable cylinder, the check valve means of said second sealing means permitting said fluid flow to unidirectionally from the interior of said intermediate cylinder into the interior of said movable cylinder; means permitting restricted fluid flow past said fixed piston; and means placing the interior of said movable cylinder between said fixed piston and said second sealing means in communication with said reservoir space with said movable cylinder substantially at its limit of outward travel.

2. A shock absorber according to claim 1, wherein said movable cylinder has an orifice formed therein adjacent to the inner end thereof, said orifice constituting said last-named means.

3. A shock absorber according to claim 1, wherein said movable cylinder has a longitudinal groove formed in the external surface thereof, said longitudinal groove by-passing said third sealing means during the terminal portion of outward movement of said movable cylinder.

4. A shock absorber according to claim 1, wherein said control cylinder has a series of axially spaced metering orifices formed in the wall thereof, said orifices being passed over by said second sealing means during movement of said movable cylinder.

5. A shock absorber according to claim 4, wherein one of said orifices which is nearest to said fixed partition is of reduced diameter permitting appreciable fluid flow therethrough only during slow movement of said movable cylinder.

6. A shock absorber according to claim 1, wherein the portion of said reservoir space which is not filled by said hydraulic fluid contains a gas under pressure.

7. A shock absorber according to claim 1, wherein said resilient means is a compressed gas.

References Cited in the file of this patent

UNITED STATES PATENTS

| | | |
|---|---|---|
| 1,855,064 | Messier | Apr. 19, 1932 |
| 1,918,698 | Gruss | July 18, 1933 |
| 2,077,935 | Johnson | Apr. 20, 1937 |
| 2,348,160 | Thornhill | May 2, 1944 |
| 2,436,573 | Heynes | Feb. 24, 1948 |
| 2,616,687 | Butterfield | Nov. 4, 1952 |